United States Patent
Stover

[15] 3,665,380
[45] May 23, 1972

[54] ELECTRONIC AIDS FOR AQUANAUTS
[72] Inventor: Harris A. Stover, Cedar Rapids, Iowa
[73] Assignee: Collins Radio Company, Cedar Rapids, Iowa
[22] Filed: June 18, 1970
[21] Appl. No.: 47,408

[52] U.S. Cl. ............................340/6 R, 340/16 R, 343/113 R
[51] Int. Cl. .............................................................G01s 3/00
[58] Field of Search ..........................340/6 R, 16 R, 16 P; 343/113 R

[56] References Cited
UNITED STATES PATENTS 3,392,391 7/1968 Royal ...............................343/113 R
3,505,638 4/1970 Watson ................................340/6 R Primary Examiner—Richard A. Farley
Attorney—Richard W. Anderson and Robert J. Crawford

[57] ABSTRACT

An aural orientation aid for an aquanaut uses pairs of space separated receiving transducers which are integrated into the aquanaut's headpiece for reception of a sound beacon signal. The perpendicular bisector of the transducer pair baseline defines a reference plane. Received signal is processed to present aurally distinguishable tone intensity patterns and/or frequency patterns which bear a definite relationship to the beacon location with respect to the reference plane. Multiple transducer pairs may be employed to aurally provide complete three dimensional orientation.

20 Claims, 17 Drawing Figures

Patented May 23, 1972

INVENTOR.
HARRIS A. STOVER

BY R. W. Anderson

AGENT

INVENTOR.
HARRIS A. STOVER

BY *R. W. Anderson*
AGENT

INVENTOR.
HARRIS A. STOVER

Patented May 23, 1972 3,665,380

INVENTOR.
HARRIS A. STOVER

BY R. W. Anderson
AGENT

INVENTOR.
HARRIS A. STOVER

BY R. W. Anderson
AGENT

INVENTOR.
HARRIS A. STOVER
BY R.W. Anderson
AGENT

INVENTOR.
HARRIS A. STOVER

ELECTRONIC AIDS FOR AQUANAUTS

This invention relates generally to electronic aids for aquanauts and more particularly to an electronic orientation and navigation aid to be utilized with underwater sound beacons.

As man explores the oceans, he encounters many problems due to the environment. He must carry a high pressure helium atmosphere with a low percentage of oxygen for breathing in order to avoid the toxic effects of heavier gases. This helium atmosphere presents a very serious communications problem because it causes distortion of the voice. The undersea noise, such as that due to bubbles generated by breathing apparatuses, is also serious. Further, the ears do not function normally and seem to lose their ability to tell the direction of sound arrival. Light has difficulty in penetrating murky and sometimes dirty waters. In this hostile environment of darkness, with the buoyancy of the water removing some of the normal effects of gravity and with the ears incorrectly indicating the direction of sound arrival, it is easy for an aquanaut to become disoriented and lost.

Tethers have been employed to avoid getting lost and in some instances trained porpoises have been used for guidance. There are very serious restrictions upon the aquanauts freedom of action within this environment.

Because of the poor lighting conditions often encountered, an electronic location and/or orientation system based on visual observations, such as have been prescribed and tested in the art, may not provide the ultimate answer as an aquanaut aid.

The object of the present invention is accordingly provision of an orientation and navigation system employing unique but simple electronic means by use of sine wave sound beacons at known locations to provide audible indication to the aquanaut of his orientation and location with respect to known sound beacon locations.

A further object of the present invention is the provision of an orientation and navigation electronic aid for an aquanaut which is relatively small, lightweight, and simple.

A still further object of the present invention is the provision of an electronic aid for an aquanaut providing an aural indication requiring neither visibility nor active participation by the aquanaut.

A still further object of the present invention is the provision of a receiving system which may be mounted directly to the aquanaut's headpiece and which lends itself to microminiaturization production techniques.

The present invention is featured in providing aural indications to an aquanaut by means of which a sound beacon location with respect to a reference plane as defined by a pair of space separated receiving transducers is presented. The system employs an audible indication principle permitting expansion of a basic single plane identification system to more refined multiple-plane, multiple-beacon systems along with aural methods of plane and beacon identification, either automatic or manual.

These and other features and objects of the present invention will become apparent upon reading the following description with reference to the accompanying drawings in which.

Figure 1:
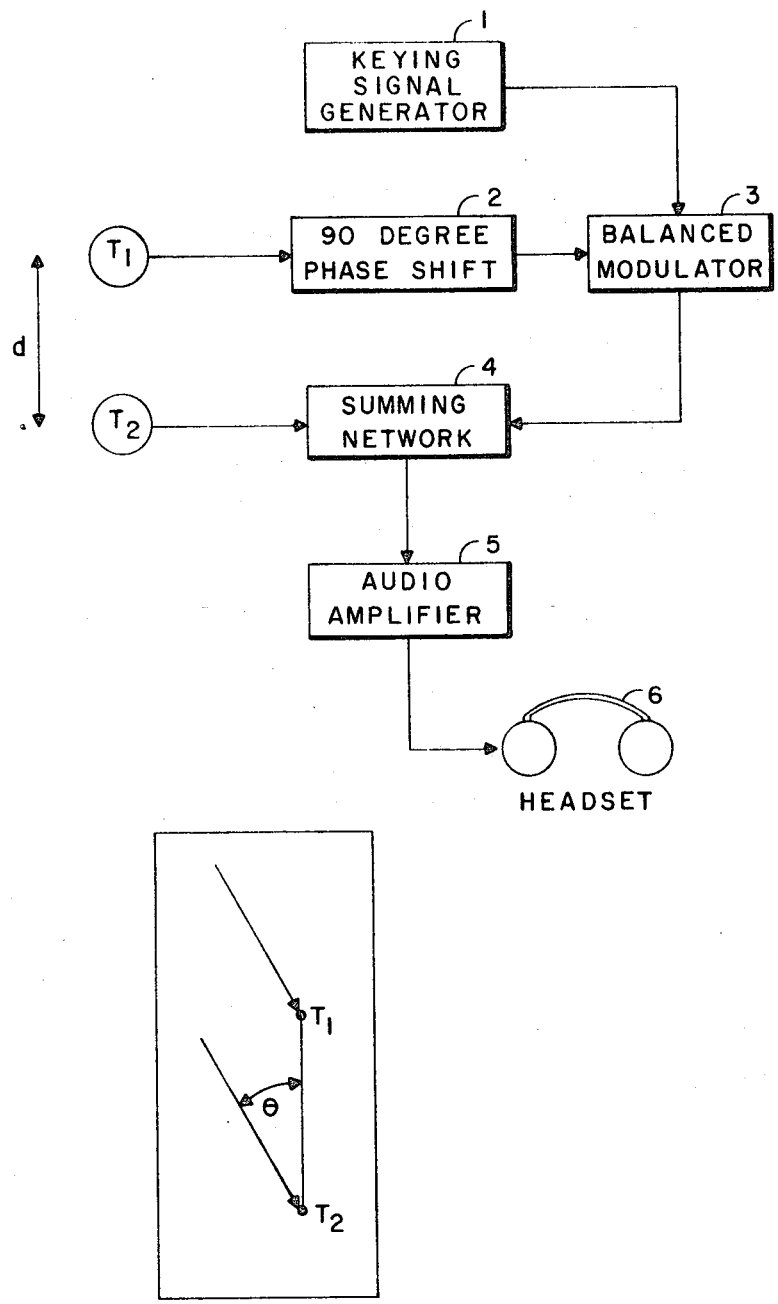
FIG. 1 is a functional diagram of a basic single plane system in accordance with the present invention.

A basic system in accordance with the principles of the present invention is illustrated in FIG. 1. In this diagram, $T_1$ and $T_2$ are receiving transducers that pick up the sound from a beacon transmitter (not illustrated). The transducers $T_1$ and $T_2$ might be mounted on the aquanaut's headpiece so as to define a predetermined spacing d between the transducers. The spacing d between $T_1$ and $T_2$ is chosen to be a predetermined portion of a wave length for the sound frequency employed. Assume for purposes of explanation that the angle between the direction of sound arrival and the line passing through the two transducers is represented by $\theta$. Then the difference D in the distance that the sound must travel in reaching the two transducers is given by equation (1), and the difference in time of arrival is given by equation (2) as follows:

$$D = d \cos \theta \qquad (1)$$
$$t_d = D/V = d \cos \theta / V; \qquad (2)$$

where $V$ is the velocity of sound propagation. Therefore, if the signal arriving at transducer $T_1$ is represented by equation (3) as:

$$S_1 = A \cos \omega t; \qquad (3)$$

where $\omega$ is the angular frequency of the sound in radians per second, then the signal arriving at transducer $T_2$ may be represented by equation (4).

$$S_2 = A \cos \omega(t + d \cos \theta/V) \qquad (4)$$

The output of transducer $T_1$ is passed through 90° phase shift network 2 so that the output of the phase shift network 2 may be represented by equation (5).

$$S_3 = A \cos (\omega t + 90°) \qquad (5)$$

The output of phase shift network 2 is passed through balanced modulator 3. Balanced modulator 3 is a phase reversing device which passes the signal $S_3$ unchanged if the input from the keying-signal generator 1 is positive but reverses the phase of the signal $S_3$ if the input from the keying-signal generator is negative. Therefore, the output of balanced modulator 3 may be represented by equation (6) as:

$$S_4 = KA \cos (\omega t + 90°); \qquad (6)$$

where $K = +1$ if the input from the keying-signal generator 1 is positive and $K = -1$ if the input from the key-signal generator 1 is negative.

In the summing network 4 the signal $S_4$ from the output of balanced modulator 3 and $S_2$ from transducer $T_2$ are added together to produce the signal $S_5$ given by expression (7) as:

$$S_5 = A \cos \omega (t + d \cos \theta/V) + KA \cos (\omega t + 90°); \quad (7)$$

which is amplified by audio amplifier 5 and passed on to headset 6. If we assume that d and $\omega$ have been selected such that $\omega d/V = \pi/2$ radians or 90°, equation (7) may be rewritten as:

$$S_5 = A \cos [\omega t + 90° (\cos \theta)] + KA \cos (\omega t + 90°). \quad (8)$$

By applying the trigonometric identity of equation (9) to both terms of equation (8) and combining like terms, equation (10) may be rewritten as equation (10).

$$\cos (\alpha + \beta) = \cos\alpha \cos\beta - \sin\alpha \sin\beta \quad (9)$$

$$S_5 = A\cos \omega t \cos [90° \cos \theta ] - A \sin\omega t \sin [90° \cos \theta](10)$$
$$+ KA \cos\omega t \cos 90° - KA \sin\omega t \sin 90°$$
$$= A \cos (90° \cos \theta) \cos\omega t - A [K + \sin (90° \cos \theta)]\sin\omega t$$

By making use of the trigonometric identity of equation (11) equation (10) may be rewritten as equation (12).

$$B \cos \omega t - C \sin \omega t = \sqrt{B^2 + C^2} \cos \left(\omega t + \tan \frac{-1C}{B}\right) \quad (11)$$

$$S_5 = A \sqrt{1 + K^2 + 2K \sin (90° \cos \theta)} \cos \left[\omega t + \tan^{-1} \frac{K + \sin(90° \cos \theta)}{\cos(90° \cos \theta)}\right] \quad (12)$$

Figure 2:
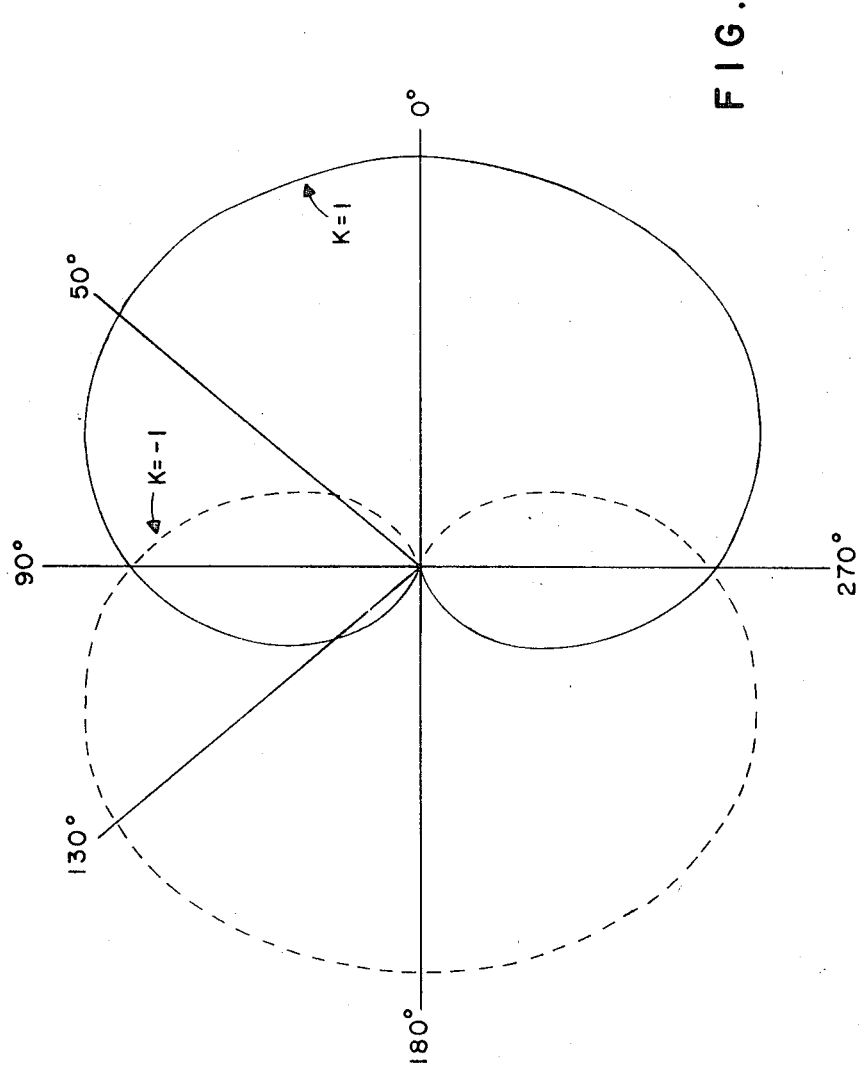
FIG. 2 is a polar graph representing magnitudes of tones presented to the aquanaut in accordance with the present invention.
Figure 3:
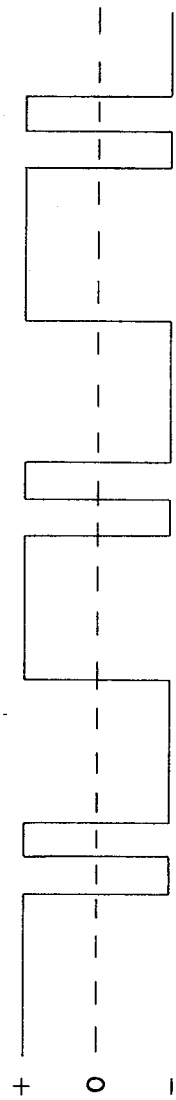
FIG. 3 is an operational waveform depicting a particular tone amplitude code function which may be employed in the present invention.

Equation (12) expresses the resulting signal voltage at the output of summation network 4 as a magnitude and phase angle of a cosinusoidal wave at the frequency, $\omega$, received by the transducer. The magnitude of the voltage given by equation (12) has a null at 180° and a maximum at 0° if $K = +1$ while it has a null at 0° and a maximum at 180° if $K = -1$. FIG. 2 is a polar graph of the magnitude of $S_5$ from equation (12) as a function of $\theta$, the direction of sound arrival. The solid curve is for $K = 1$ while the dashed curve is for $K = -1$. Hence when the balanced modulator 3 of FIG. 1 is switched by the keying-signal generator 1, the amplitude of the signal as heard in the headphones will jump from the solid curve of FIG. 2 to the dashed curve or vice versa. Thus if the sound is arriving from a direction 90° from the line of the transducers there will be no change in amplitude when the switching occurs. However, if it is from a direction between 0° and 90° or between 270° and 360° there will be an increase in amplitude when it is switched from $K = -1$ to $K = +1$. Likewise, if it is from a direction between 90° and 270° there will be a decrease in amplitude when it is switched from $K = -1$ to $K = +1$. Thus the basis has been established for determining whether the sound arrived from a direction to the right or to the left of the plane which forms a perpendicular bisector of the line between the two transducers. One more thing must be provided to make the system convenient to use and that is a suitable keying waveform for the keying-signal generator 1. The waveform shown in FIG. 3 is suitable. When the output from keying-signal generator 1 in FIG. 1 is positive as shown in FIG. 3, $K = +1$; and when the output from keying-signal generator 1 is negative, $K = +1$.

Figure 4:
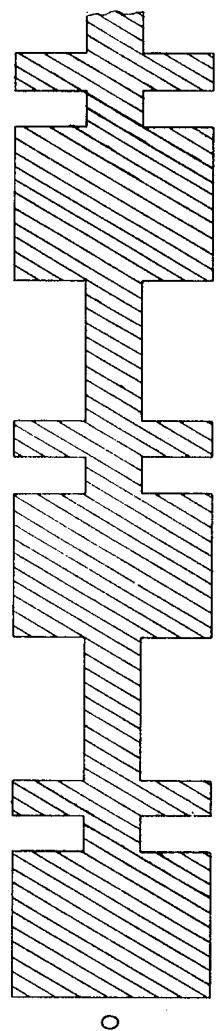
FIGS. 4 and 5 are diagrammatic representations of tone amplification sequences obtained for particular beacon orientations symmetrically dis-posed with respect to an orientation base line in accordance with the present invention.
Figure 5:
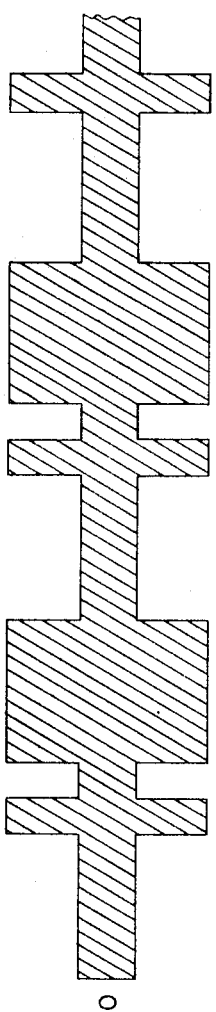

If the keying-signal generator has the waveform shown in FIG. 3 a sound arriving from the direction designated as 50° (see FIG. 2) would have an amplitude form as shown in FIG. 4 while one arriving from the direction designated as 130° would have the amplitude form shown in FIG. 5. Note that FIG. 4 has a long pulse followed by a short pulse indicating that the sound came from the right of the 90° plane of FIG. 2 while FIG. 5 has a short pulse followed by a long pulse indicating that it came from the left of the 90° plane of FIG. 2. The relative magnitude of the pulse and the tone interval between pulses is an indication of the degree of departure from the 90° plane.

Figure 6:
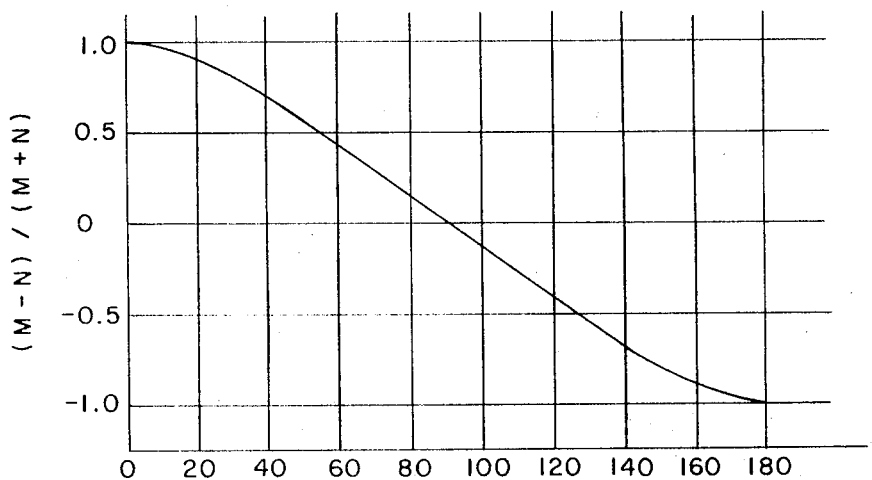
FIG. 6 is a plot of tone amplitude modulation depth as a function of beacon orientation angle with respect to pickup transducers employed in the present invention.

Sound arriving from a direction coincident with the 90° plane will have only the steady tone with no pulses while sound arriving from a direction perpendicular to the 90° plane will contain only pulses with no tone between pulses. If the magnitude of the signal when $K = 1$ is M and the magnitude when $K = -1$ is N, then the modulation depth or modulation index may be written as M − N/M + N. This is plotted as a function of the angle $\theta$ in FIG. 6. It is noted from this curve that the modulation depth is nearly proportional to the angle of departure from the 90° plane so that the listener can with a fairly high degree of confidence judge the degree of departure of the direction of sound arrival from the 90° plane in addition to determining from which side of the 90° plane the sound arrives.

The system as described above, although it will supply an aquanaut with considerable information in a simple audible form is not sufficient for him to maintain his orientation as he moves about in the water. However, by adding two additional planes as shown in FIG. 7, which may be accomplished by adding two additional transducers and the associated switching equipment, the means for his maintaining his orientation relative to the beacon signal at all times is provided.

Figure 7:
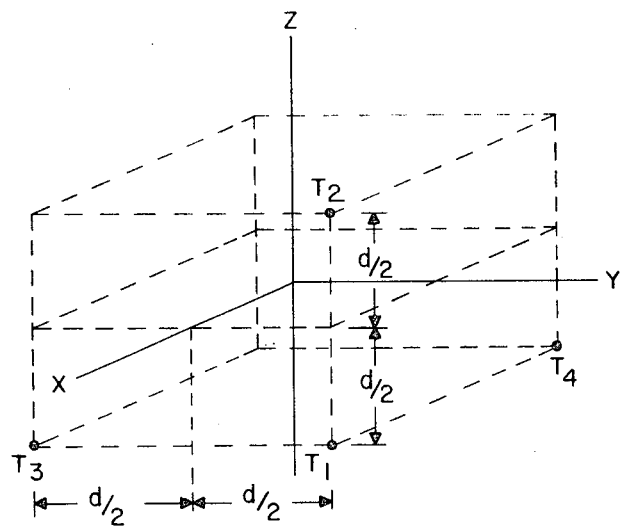
FIG. 7 is a three-dimensional coordinate axis system depicting multiple pickup transducer orientations for a three-plane orientation system in accordance with the present invention.

In FIG. 7, the lines $x$, $y$ and $z$ are a system of coordinate axes formed by the intersection of the three planes x–y, x–z, and y–z which are the three reference planes for the beacon tone orientation system. The dashed lines help in visualizing the location of the four transducers. $T_1$, $T_3$, and $T_4$ are located $d/2$ below the x–y plane $T_2$ is located $d/2$ above the x-y plane. Transducers $T_1$ and $T_2$ are used to determine angle of sound arrival relative to the x–y plane since the x–y plane is a perpendicular bisector of the line between $T_1$ and $T_2$. Transducers $T_1$ and $T_3$ are used to determine angle of sound arrival relative to the x–z plane since the x–z plane is a perpendicular bisector of the line between $T_1$ and $T_3$. Transducers $T_1$ and $T_4$ are used to determine angle of sound arrival relative to the y–z plane since the y–z plane is a perpendicular bisector of the line between transducers $T_1$ and $T_4$. The method of determining the direction of sound arrival for each of the planes of FIG. 7 is the same as that described for FIG. 1 which applies to a single plane.

One of several methods of separating the audible direction indication for the three planes must be employed. One method of doing this is to listen to each of the three pairs of transducers sequentially and employ a different code in the keying-signal generator for each pair of transducers for identification purposes.

Figure 8:
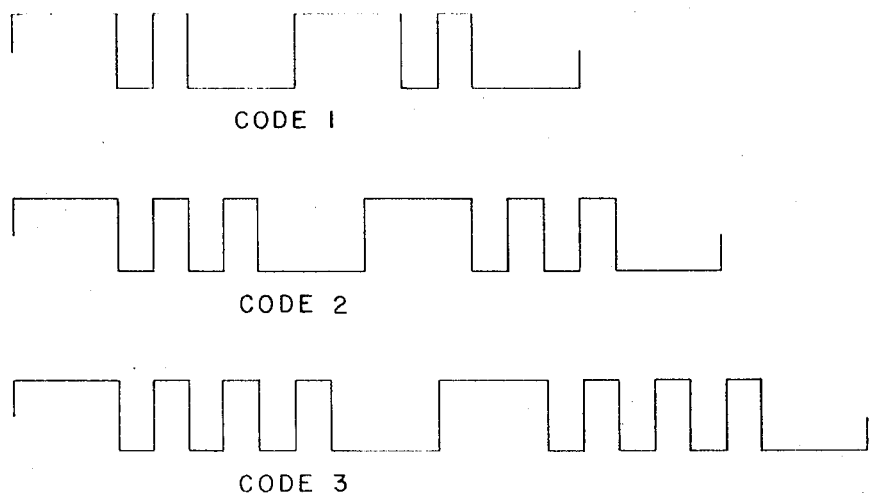
FIG. 8 shows diagrammatic waveforms of three discretely different codes which might be employed with a multiple plane detection system in accordance with the present invention.

Three satisfactory codes are shown in FIG. 8. The first code will give either one short pulse followed by a long pulse or a long pulse followed by one short pulse depending on the side of the plane from which the sound arrives. The second code will give either two short pulses followed by a long pulse or a long pulse followed by two short pulses depending upon the side of the plane from which the sound arrives. The third code will give either three short pulses followed by a long pulse or a long pulse followed by three short pulses depending upon the side of the plane from which the sound arrives.

Figure 9:
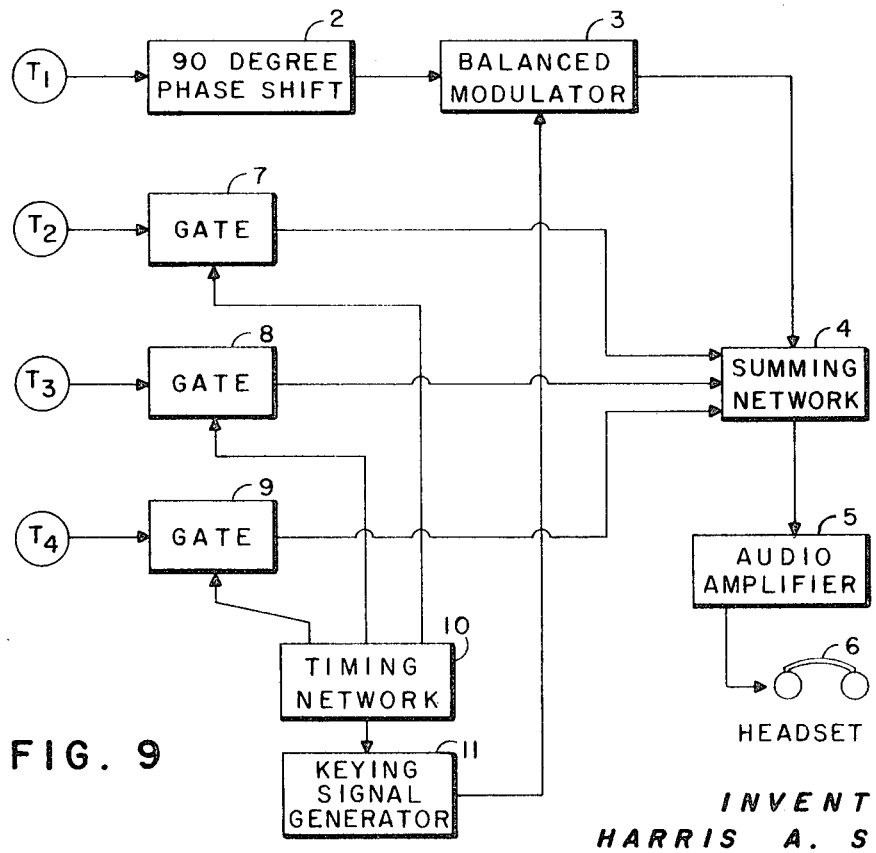
FIG. 9 is a functional diagram of a three-plane orientation and navigation system.

FIG. 9 shows a simple block diagram of a system employing the four transducers to provide an audible indication of the direction of sound arrival relative to three planes and therefore a completely unambiguous three-dimensional audible indication is provided.

In FIG. 9, the 90° phase shift network 2, balanced modulator 3, summing network 4, audio amplifier 5 and headset 6 perform functions similar to their functions in the system shown in FIG. 1. Transducers $T_3$ and $T_4$ have been added. Gates 7, 8 and 9 permit the signal from only one of the transducers $T_2$, $T_3$ or $T_4$ to pass to summing network 4 at any given time. Timing network 10 also controls the gates 7, 8 and 9 to sequentially permit the signals from transducers $T_2$, $T_3$ and $T_4$ to pass to the summing network 4. Timing network 10 also controls keying-signal generator 11 to supply code 1 to balanced modulator 3 when gate 7 passes the output of transducer $T_2$ to the summing network 4, to supply code 2 to balanced modulator 3 when gate 8 passes the output of transducer $T_3$ to the summing network 4 and to supply code 3 to balanced modulator 3 when gate 9 passes the output of transducer $T_4$ to the summing network. The output from summing network 4 as heard in headset 6 after amplification by audio amplifier 5 is then sequentially determined by the pair of transducers $T_1$ and $T_2$ with code 1 followed by transducers $T_1$ and $T_3$ with code 2 followed by transducers $T_1$ and $T_4$ with code 3. The sequence then continues to repeat. The aquanaut will hear either one short pulse followed by a long pulse or a long pulse followed by one short pulse depending upon the side of the $x$–$y$ plane from which the sound arrives. The level of the sound between pulses will indicate the amount of departure from the plane. A sound arriving from a direction coincident with the plane will have the same level between pulses as during pulses. This level between pulses becomes less as the direction of sound arrival becomes more nearly perpendicular to the $x$–$y$ plane. He will then hear either two short pulses followed by a long pulse or a long pulse followed by two short pulses which will tell him from which side of the $x$–$z$ plane the sound arrived and the level between pulses will indicate the degree of departure of the direction of sound arrival from the $x$–$z$ plane. This is followed by either three short pulses followed by a long pulse or a long pulse followed by three short pulses which will tell him from which side of the $x$–$z$ plane the sound arrived. The level of the sound between pulses will indicate the degree of departure from the $y$–$z$ plane. At this time he has received a complete aural indication of the direction of sound arrival.

Figure 10:
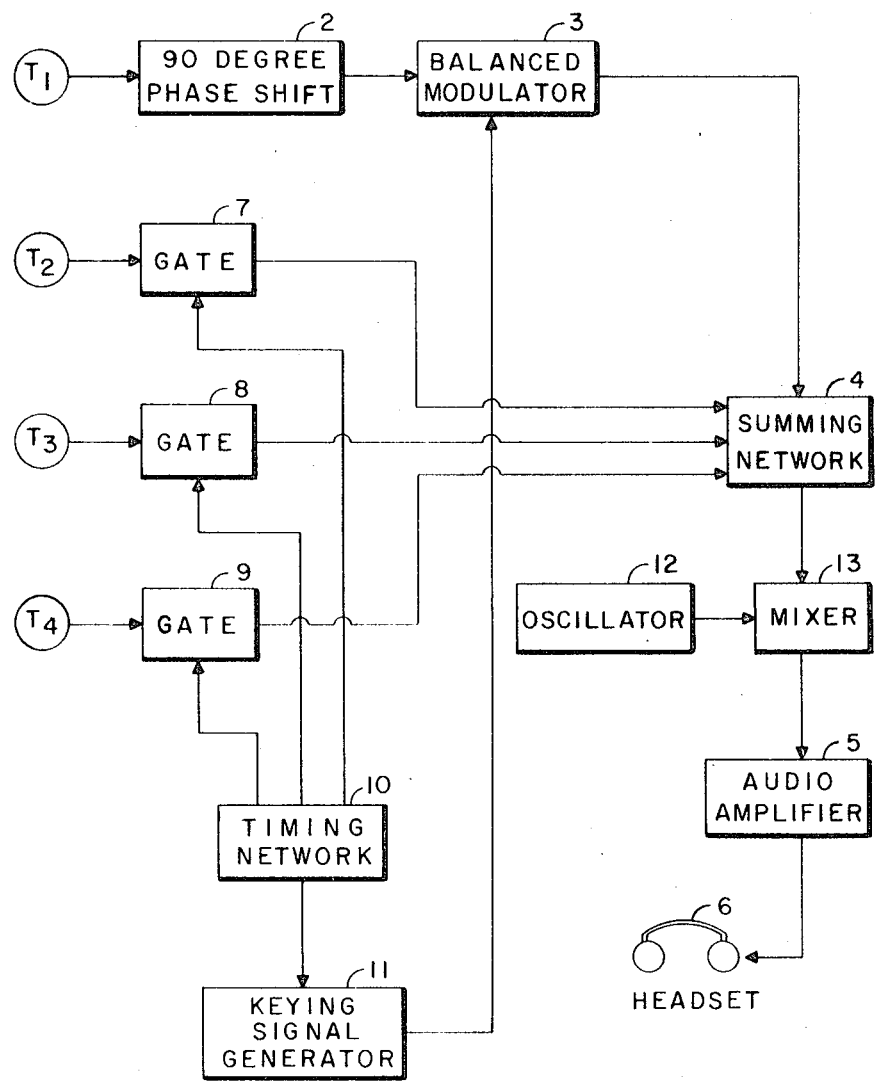
FIG. 10 is a functional diagram of an improved embodiment of the basic system depicted in FIG. 9.

One difficulty which may be encountered with the systems as discussed thus far is that the signal picked up directly by the ear may interfere with the interpretation of the aural signal from the headset. This difficulty may be overcome by picking a relatively high frequency for the beacon signal and converting it to a lower frequency in the receiving system. One simple method of doing this is shown in FIG. 10 where an oscillator 12 and a mixer 13 has been inserted between summing network 4 and audio amplifier 5 of the system of FIG. 9. Hence the aural direction signal from headset 6 is at a different frequency than the direct signal which might be picked up by the ear thus removing the problem.

Figure 11:
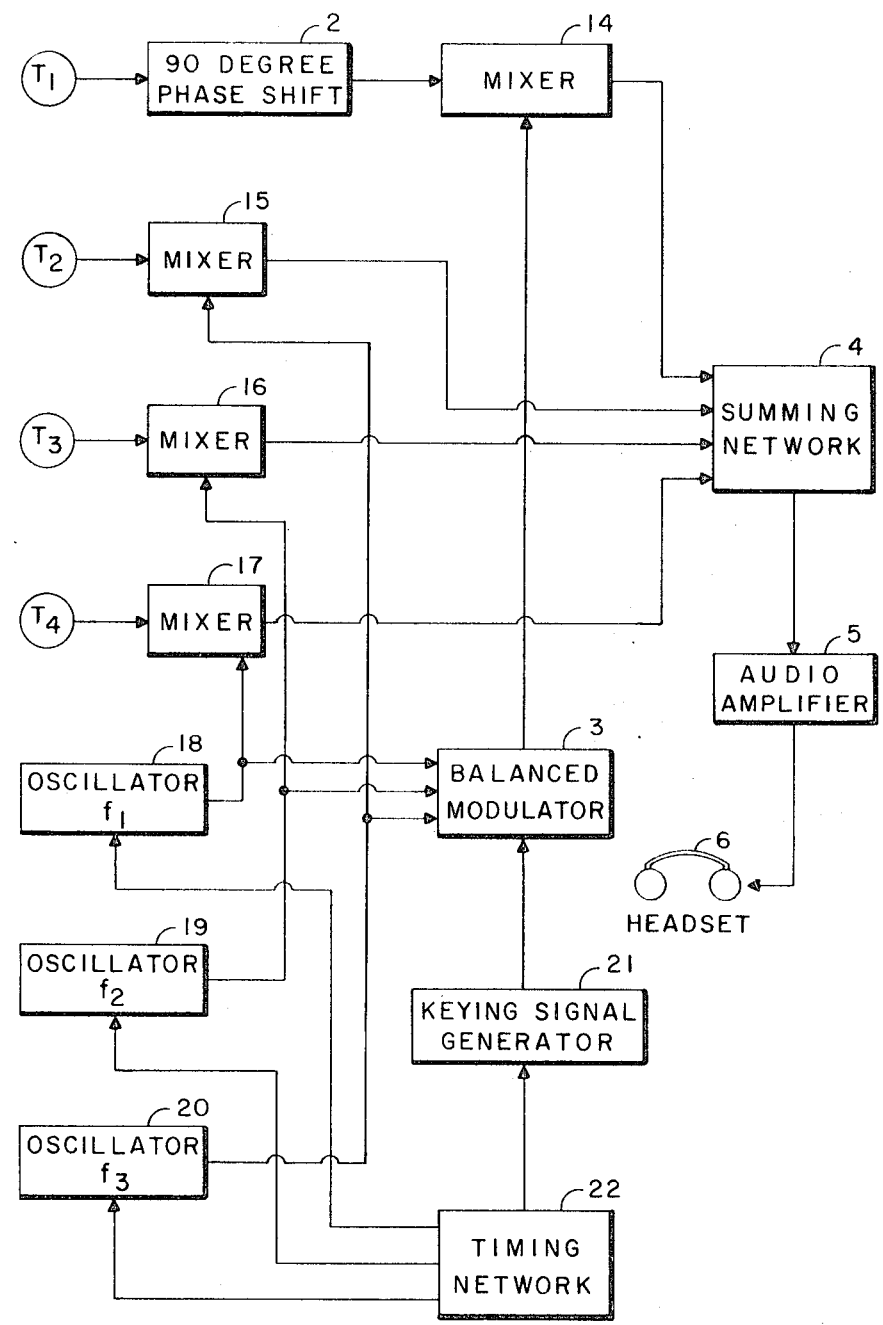
FIG. 11 is a functional block diagram of an alternative embodiment employing multiple frequencies rather than multiple codes to establish a three-plane orientation system.

Frequency conversion as employed in the system of FIG. 10 may be used to dispense with the three time codes of FIG. 8 as used in the systems of FIGS. 9 and 10. Instead of the time codes three different frequencies may be used to identify the signals relative to the three different planes. A simple block diagram employing this technique is shown in FIG. 11. In this system mixers 14, 15, 16 and 17 have been inserted in the path from each transducer to convert the frequency of the incoming signal to a new frequency, and the three oscillators 18, 19 and 20 together with the incoming signal determine the new frequencies. In the system shown in FIG. 11 the timing network 22 sequentially activates oscillators 18, 19 and 20 one at a time. It also provides the correct timing for the keying-signal generator which for this system only has to generate one code such as code 1 of FIG. 8. When oscillator 18 is activated by timing network 22, an oscillator output is supplied to mixer 17 and to balanced modulator 3 which in turn passes it to mixer 14. The outputs from mixers 14 and 17 are combined in summing network 4 to produce either a short pulse of tone followed by a long pulse or a long pulse followed by a short pulse depending upon which side of the $y$–$z$ plane from which the sound arrives. The frequency of the tone is determined by the frequency of the beacon signal and the frequency of oscillator 18. When oscillator 19 is activated by timing network 22 an oscillator signal is fed to mixer 16 and also to mixer 14 through balanced modulator 3. The outputs of mixers 14 and 16 are combined in summing network 4 to produce either a short pulse of tone followed by a long pulse or a long pulse followed by a short pulse depending upon which side of the $x$–$z$ plane from which the sound arrives. Note that since the frequency of oscillator 19 is different than the frequency of oscillator 18 the tone will have a different frequency which will serve to identify the plane with which it is associated. When oscillator 20 is activated by timing network 22, an oscillator signal is fed to mixer 15 and also to mixer 14 through balanced modulator 3. The outputs of mixers 14 and 15 are combined in summing network 4 to produce either a short pulse of tone followed by a long pulse or a long pulse followed by a short pulse depending upon from which side of the $x$–$y$ plane the sound arrived. Since the frequency of oscillator 20 is different than the frequencies of oscillators 18 and 19 a new frequency will be produced identifying it as being associated with the $x$–$y$ plane. Thus the system of FIG. 11 provides the same information as the systems of FIGS. 9 and 10 but requires only a single code and the plane with which a given tone pulse is associated is identified by the tone frequency.

In the system shown in FIG. 11 the balanced modulator 3, which is only a phase reversing device under the control of the keying-signal generator 21, is shown in the signal lines between the oscillators 18, 19, 20 and the mixer 14. Alternatively it could have been in the signal line between transducer $T_1$ and 90° phase shifter 2 or between 90° phase shifter 2 and mixer 14 or between mixer 14 and summing network 4. The result at the input to summing network 4 would have phase reversals at the same time and the system would operate the same except that there may be an advantage to putting the balanced modulator in the oscillator lines when operating under weak signal conditions.

The systems of FIGS. 9, 10 and 11 for providing an aural three dimensional indication of the direction of sound arrival depended upon sequential indications relative to the three mutually perpendicular planes. Since the human ear is quite effective in distinguishing among several tones of different frequencies, as demonstrated by Morse code operators when they copy one signal out of a multitude, the sequential indication is not necessary when using different frequencies for each plane. All three indications can be presented simultaneously with each at its own identifying frequency allowing the human ear to differentiate among them. The simple block diagram of FIG. 12 shows a system which accomplishes this.

Figure 12:
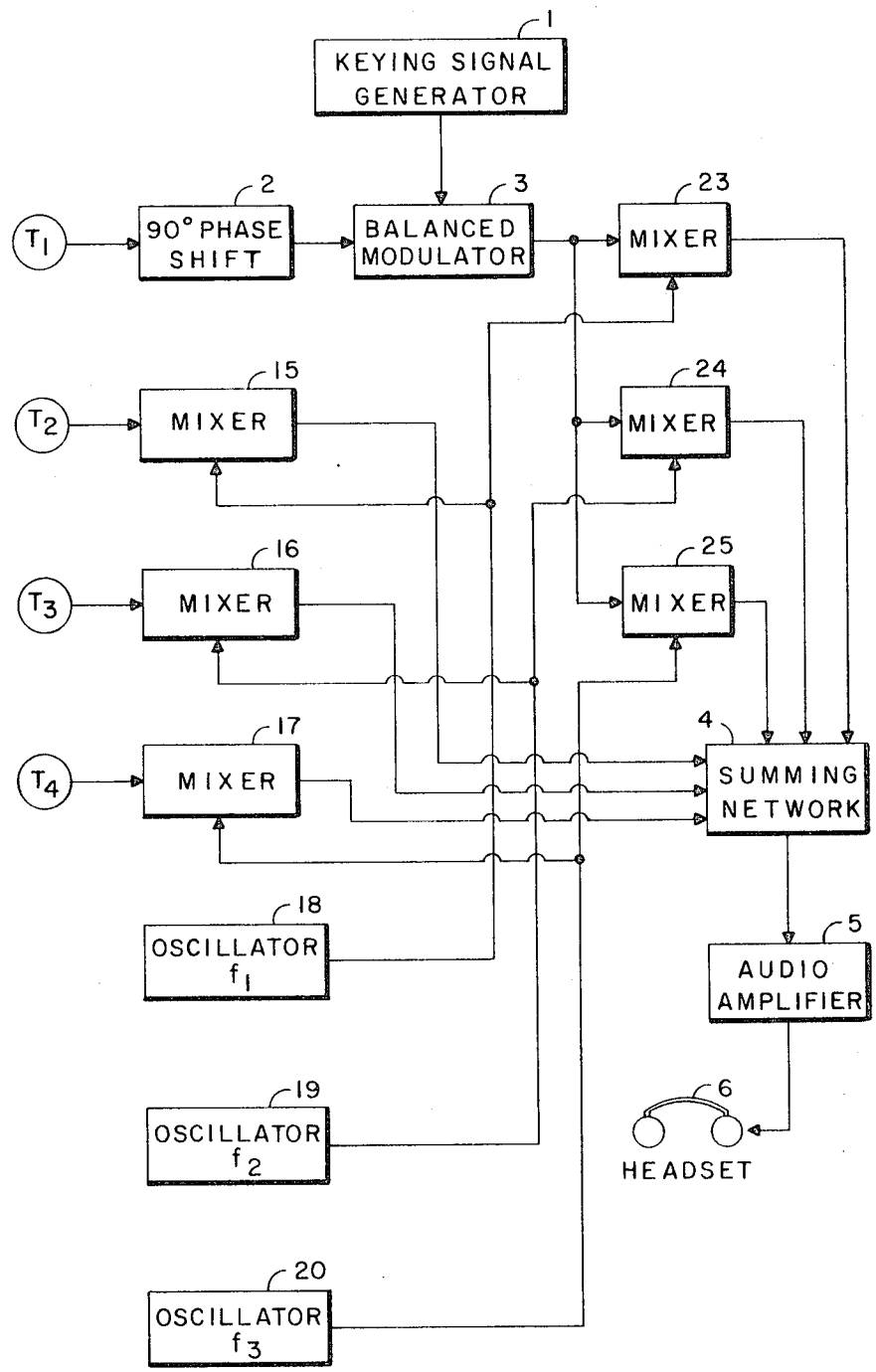
FIG. 12 is a functional diagram of a multiple frequency system in accordance with the embodiment of FIG. 11 employing simultaneous concepts rather than sequential.

In the system of FIG. 12 first consider the signals involving the transducer pair $T_1$ and $T_2$. Note that as far as this transducer pair is concerned the operation of the system of FIG. 12 is the same as the operation of the system of FIG. 1 except that the frequencies have been changed by oscillator 18 and mixers 15 and 23 prior to being supplied to the summing network 4. Likewise as far as the transducer pair $T_1$ and $T_3$ is concerned the operation is the same as for the transducer pair of FIG. 1 except that the frequencies have been changed by oscillator 19 and mixers 16 and 24 prior to being supplied to the summing network 4. Similarly as far as the transducer pair $T_1$ and $T_4$ is concerned, the operation is the same as for the transducer pair of FIG. 1 except that the frequencies have been changed by oscillator 20 and mixers 17 and 25 prior to being supplied to the summing network 4. Since the summing network 4 is linear the inputs at the different frequencies will add linearly and will not have an effect on one another. However, the ones at the same frequency will add as described with reference to FIG. 1. The output of the summing network 4 which is amplified by audio amplifier 5 before driving the headset 6 contains three audio frequencies. One of the frequencies will have either a short tone pulse followed by a long tone pulse or a long tone pulse followed by a short tone pulse depending upon the side of the $x$–$y$ plane from which the sound arrived. Another of the frequencies will have either a short tone pulse followed by a long tone pulse or a long tone pulse followed by a short tone pulse depending upon the side of the $x$–$z$ plane from which the sound arrived. The third frequency will have either a short tone pulse followed by a long tone pulse or a long tone pulse followed by a short tone pulse depending upon the side of the $y$–$z$ plane from which the sound arrived. For each frequency the level of the tone between pulses provides an indication of the degree of departure of the direction of sound arrival for the plane associated with that particular frequency. Thus the system of FIG. 12 provides three simultaneous output frequencies each containing direction information relative to one of the three mutually perpendicular planes. The human ear has the capability of selectively listening to any one of the frequencies and this may be preferable for many people over the sequential systems discussed earlier and experience in using the system may enhance this preference.

Note from FIG. 2 that if for one of the frequencies the tone between pulses goes to zero the signal is arriving from a direction coincident with the line between the transducer pair associated with that particular signal whether that signal be identified by one of the frequencies used for identification in the systems of FIGS. 11 and 12 or one of the codes used for identification in FIGS. 9 and 10. Since this null is quite sharp and coincides with the direction for which the other two frequencies have constant tones, any one of the three axis directions can be determined very accurately while other directions are good estimates. Thus if the aquanaut wishes to determine the direction from which the sound arrives very accurately he may move the transducers until one of the axes of FIG. 7 is aligned with the direction of sound arrival.

The systems for indicating the direction of sound arrival which have been discussed can be very useful in helping the aquanaut to maintain his orientation or to guide him to the beacon. However, it cannot provide him with complete information as to his position. This may be accomplished in three dimensional space by using three beacons. The direction to each of the three beacons may be combined to indicate position. However, two beacons will furnish position in two dimensional space which will be adequate for many applications while direction to a single beacon may be sufficient for other applications.

In order to keep the system simple and provide a simple aural indication of the direction of sound arrival, it may be preferable to supply the aquanaut with information from only one beacon at a time. In this case it is desirable for the aquanaut to be able to choose which beacon he wishes to use at a particular time. This may be accomplished by having a separate frequency for each sonic beacon and supplying the proper filters to allow the receiving equipment to select any particular beacon's frequency while rejecting the others. This may be a manually operated switch which selects the correct transducer filters and the corresponding oscillator frequencies for the systems of FIGS. 10, 11 or 12 if the same audio output frequencies are desired for each beacon frequency.

When the systems of FIGS. 9 or 10 are employed, only one frequency is applied to the headset for each beacon frequency and the directional coordinates are identified by coding rather than by frequencies, so that three beacons having different frequencies could be employed at the same time and the human ear could selectively listen to whichever tone it wished. Alternatively, when using the systems of FIGS. 9 or 10, audio filters could be inserted in the output of the summing network 4 to pass the tone from whichever beacon the aquanaut selects. Since the aquanaut could manually switch filters, he could manually select the beacon he wishes to use at a given time. A similar result may be obtained for the system of FIG. 10 by making audio amplifier 5 have a very narrow frequency response and manually switching the frequency of oscillator 12 to correspond to the particular beacon frequency. By switching among beacons which have known locations the aquanaut may determine his position. However, listening to only a single beacon will permit him to maintain his orientation and to move to that beacon if desired.

The entire system will be relatively simple and can be mounted on the aquanaut's headpiece. A separate battery unit may be provided if desired. Redundancy could be added if required for reliability purposes. An alternative to redundancy would be for each aquanaut to carry a beacon in addition to the units described here. The beacon would be used in emergencies to guide another aquanaut to the aquanaut in trouble. Thus if his unit of the type described here failed and he was lost, he could turn on his beacon and wait for another aquanaut to find him and guide him back to his base.

Simple units as described here will provide considerable navigational aid to aquanauts and enable them to function satisfactorily without the guidance of trained porpoises.

Figure 13:
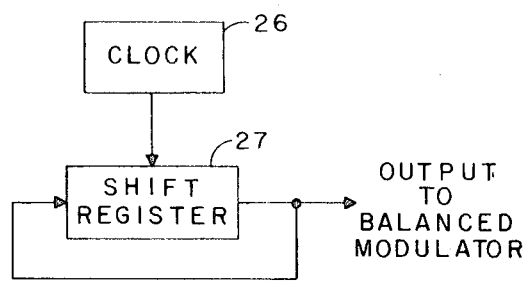
FIG. 13 is a functional diagram of a code generator system which might be employed in the present invention.

Many techniques can be used to generate the simple waveforms required for the keying-signal generator 1 of FIG. 1. Perhaps one of the simplest and most straightforward is a simple shift register with the code stored in it with its output fed back to its input so that the code continues to circulate. This is shown in the block diagram of FIG. 13. For each clock pulse one of the bits stored in the shift register is shifted to the output and also back into the input again. Since the shift register has one stage for each bit in the code, the same code will continue to repeat. Shift registers of the required capacity are available on a single small silicon chip.

Figure 14:
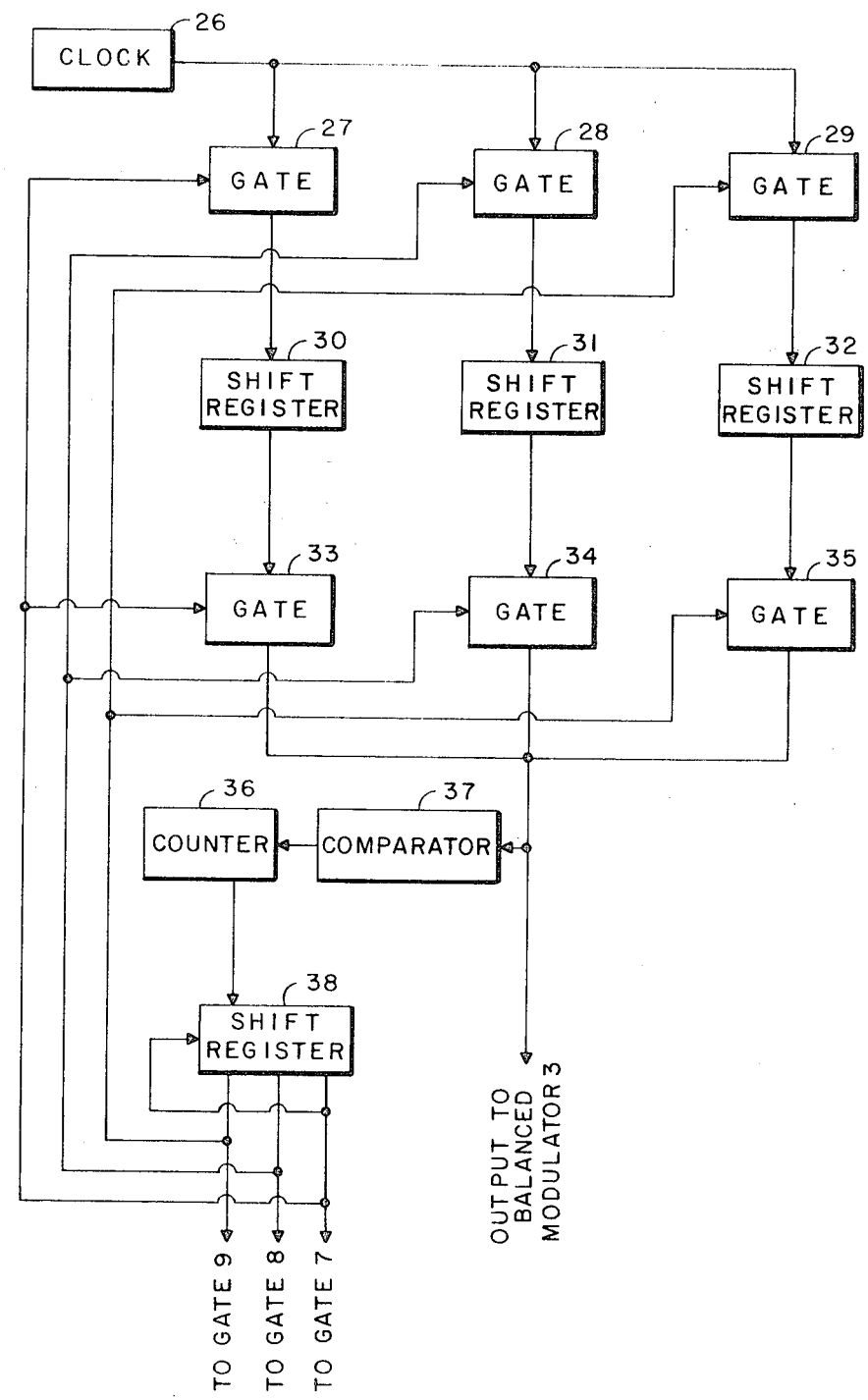
FIG. 14 is a functional diagram of a logic network which may be utilized to generate signals required from the timing network and keying signal generator portions of the embodiments of FIGS. 9 and 10.

Logic networks may also be used to generate the signals required from the timing network 10 and keying-signal generator 11 of FIGS. 9 and 10. Although these are shown as separate functional blocks on the diagrams, they may be constructed as a single functional unit. Many methods of accomplishing this result are feasible. One of them is shown diagrammatically in FIG. 14. In FIG. 14 each of the three codes of FIG. 8 is stored in one of the three shift registers 30, 31 and 32. Only one of these shift registers is operational at a time as controlled by gates 27, 28, 29, 33, 34 and 35. Assume that these gates have the correct operating voltages to block all signals to and from shift registers 31 and 32 making them inoperative. Further assume that these gates have the correct operating voltages to pass signals to and from shift register 30 so that it is operative. Shift register 30 has one of the three codes stored in it. Each clock pulse from clock 26 shifts one bit of the code out the output where it is fed back to the input as well as being supplied to the balanced modulator 3. This output is also fed to comparator 37 which performs the function of recognizing a particular pattern in the code. For example, it may recognize three consecutive zeros which is the pattern occurring at the end of each of the three codes of FIG. 8. Upon recognizing this pattern comparator 37 provides a pulse to counter 36. Counter 36 is provided to determine the number of repetitions of each of the basic code patterns of FIG. 8. For example, to provide the two repetitions as shown in FIG. 8 this counter could be a simple flip-flop which would count down by 2. If only one repetition is required, the counter may be omitted, and the pulse from comparator 37 may be fed directly to shift register 38. A pulse from counter 36 into shift register 38 indicates that it is time to shift to the next code. Shift register 38 stores the necessary information to permit the correct gates to pass signals while all the other gates block signals. An input pulse from counter 36 causes the information in the shift register to shift so that signals associated with the next code will be passed and signals associated with the other codes will be blocked. Since the output of the last stage of the three stage shift register 38 is fed back into the first stage, it will have the correct code to activate the first set of code gates again after the third code has completed its cycle. Hence all of the timing and keying-signal voltages required by the systems of FIGS. 9 and 10 can be generated as shown in FIG. 14. Each shift register could be built on an individual silicon chip and there is an excellent probability that all of the circuitry of FIG. 14 could be put on a single silicon chip.

Figure 15:
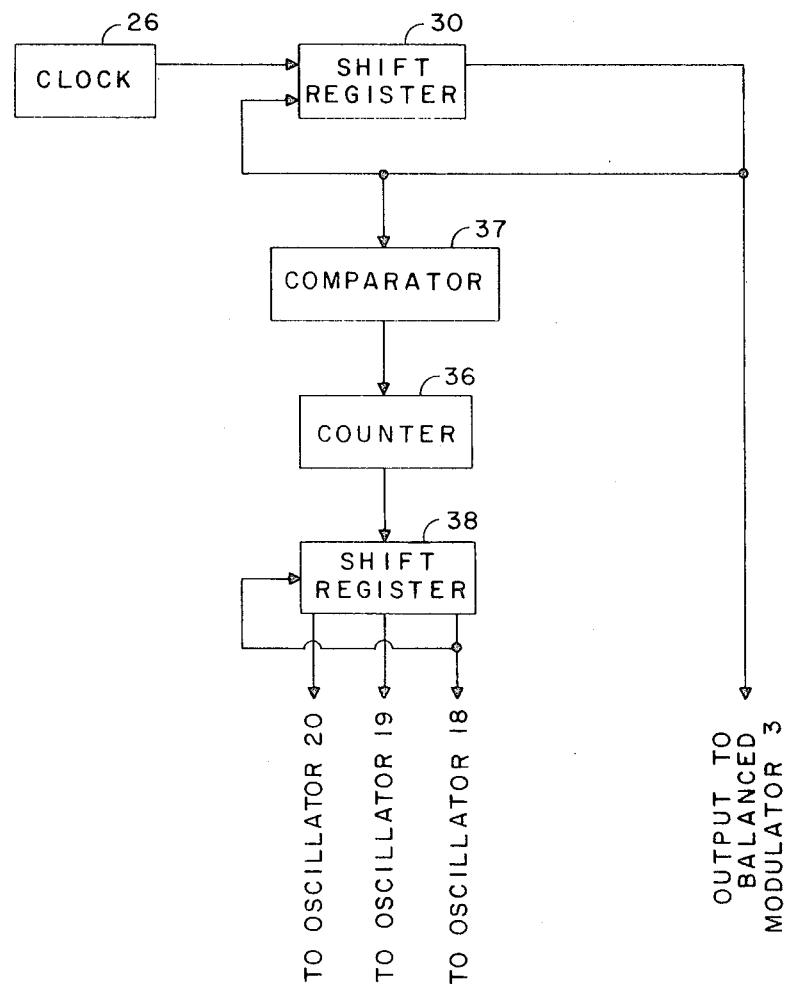
FIG. 15 is a functional diagram of a logic network which might be utilized to provide the functions of the timing network and keying signal generator for the system shown in the embodiment of FIG. 11.

The timing network 22 and keying-signal generator 21 for the system shown in FIG. 11 may be much simpler than for the systems of FIGS. 9 and 10 but more complex than that for the systems shown in FIGS 1 and 12. FIG. 15 is a block diagram of a method of fulfilling the timing network 22 and keying-signal generator 21 requirements for the system of FIG. 11. In FIG. 15 shift register 30 has the desired code stored in it. Only one code is required for the system of FIG. 11. Each clock pulse from clock 26 shifts one bit of the desired code out of the shift register 30 output stage and back into its input stage. The bit shifted from the output stage of shift register 30 is fed to balanced modulator 3 of FIG. 11 and also to comparator 37. The purpose of comparator 37 is to recognize a particular pattern indicating the end of a code pattern. For the code shown in FIG. 3 this may be simply recognizing three consecutive zeros to indicate the end of the basic code pattern. Whenever the code pattern is recognized, a pulse is transmitted to counter 36 which determines the number of times that the code is repeated before switching to a new frequency associated with a new directional plane. Three stage shift register 38 has the necessary information stored in it to activate one of the oscillators 18, 19 or 20 and deactivate the other two. Each time a shift pulse if received from counter 36 shift register 38 activates the next oscillator. Since the output from the last stage of shift register 38 is fed back into the input, the complete cycle will continue to repeat. All of the circuitry of FIG. 15 except for the clock could be put on a single silicon chip. Since the clock may be a simple free running multivibrator, it is possible that it could also be on the same chip. The timing and keying-signal generation for the system of FIG. 11 may be accomplished as shown in FIG. 15.

In the systems shown in FIGS. 9 and 10 which employ the three codes of FIG. 8 in sequence for each of the three planes, it may be difficult for the user to determine where one code ends and the next begins. This slight difficulty may be overcome by adding a gate to the input of audio amplifier 5 to completely kill the audible signal between codes. This will identify the beginning of the codes so that they are easily identified. The signal for opening and closing this gate can be obtained from counter 36 in FIGS. 14 and 15 to inhibit the signal from the audio amplifier for one count period prior to supplying a trigger pulse to shift register 38.

Figure 16:
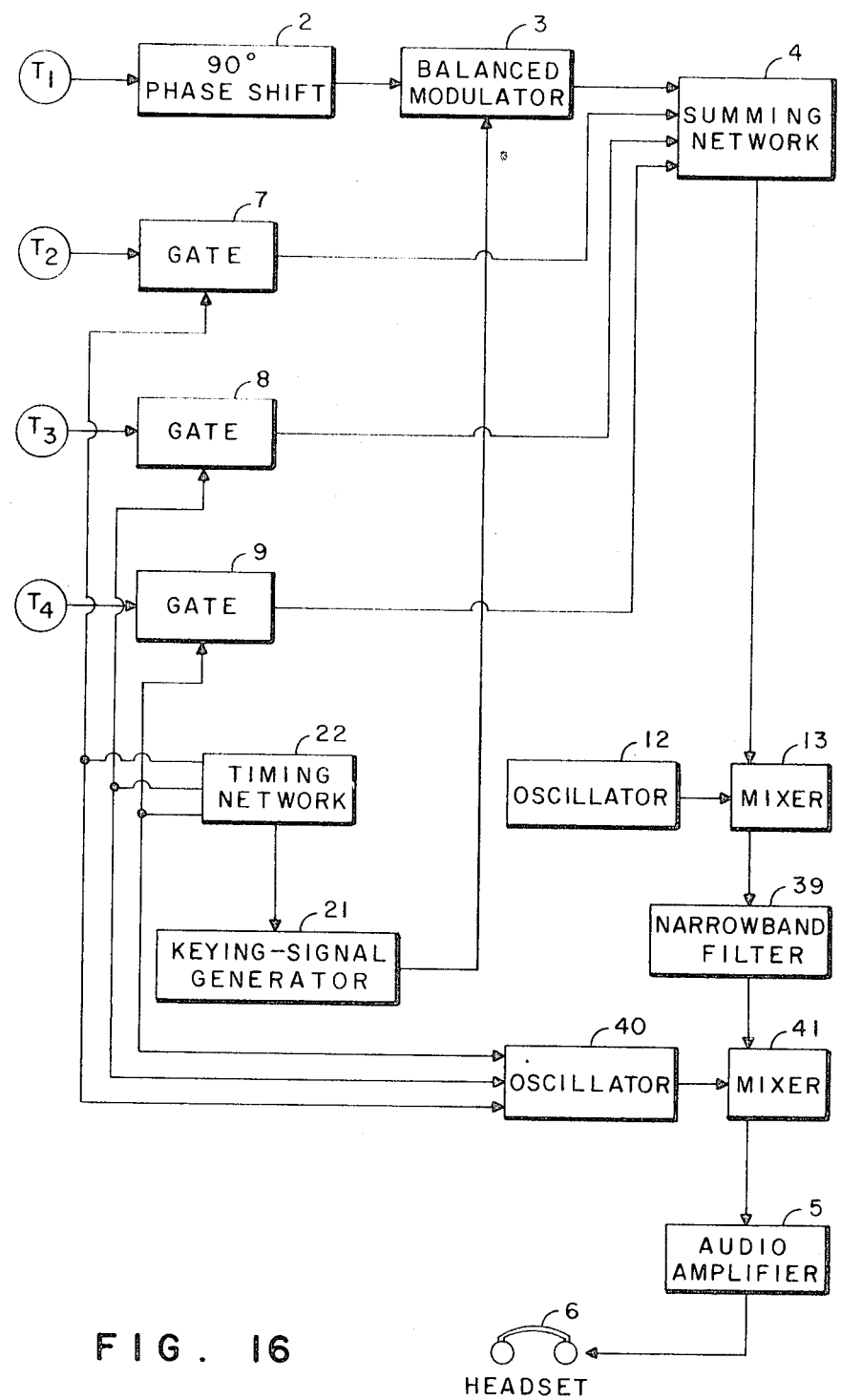
FIG. 16 is a functional embodiment of a still further embodiment employing a single code and frequency coding for plane identification, with provision for operation with beacons of different frequencies.

FIG. 16 will serve as an example of some of the variations that may be derived from the more basic systems discussed earlier. The system shown in FIG. 16 operates similarly to the system of FIG. 10 except that only one code is required so that the timing network 22 and keying-signal generator 21 of FIGS. 11 and 15 may be used rather than the more complex timing network 10 and keying-signal generator 11 of FIGS. 10 and 14. Also the combination of oscillator 12, mixer 13, and narrow band filter 39 provides for easy selection of the desired beacon signal. Oscillator 12 is adjusted to permit only the desired beacon signal to pass through narrow band filter 39. When it is desired to receive a different beacon, the frequency of oscillator 12 is changed to the frequency corresponding to the new beacon selection. Since only one keying code is being used in this version of the system oscillator 40 and mixer 41 are used to provide frequency coding for the three planes. The signals from timing network 22 which open the correct gate 7, 8 or 9 sequentially in time also change the frequency of oscillator 40 so that there is a different output signal frequency corresponding to each of the three gates. This system provides a very convenient method of selecting any desired beacon from a number that may be transmitting at the same time while providing the same simple frequency coding of the three planes for each beacon and using a single simple time code such as code 1 of FIG. 8.

Figure 17:
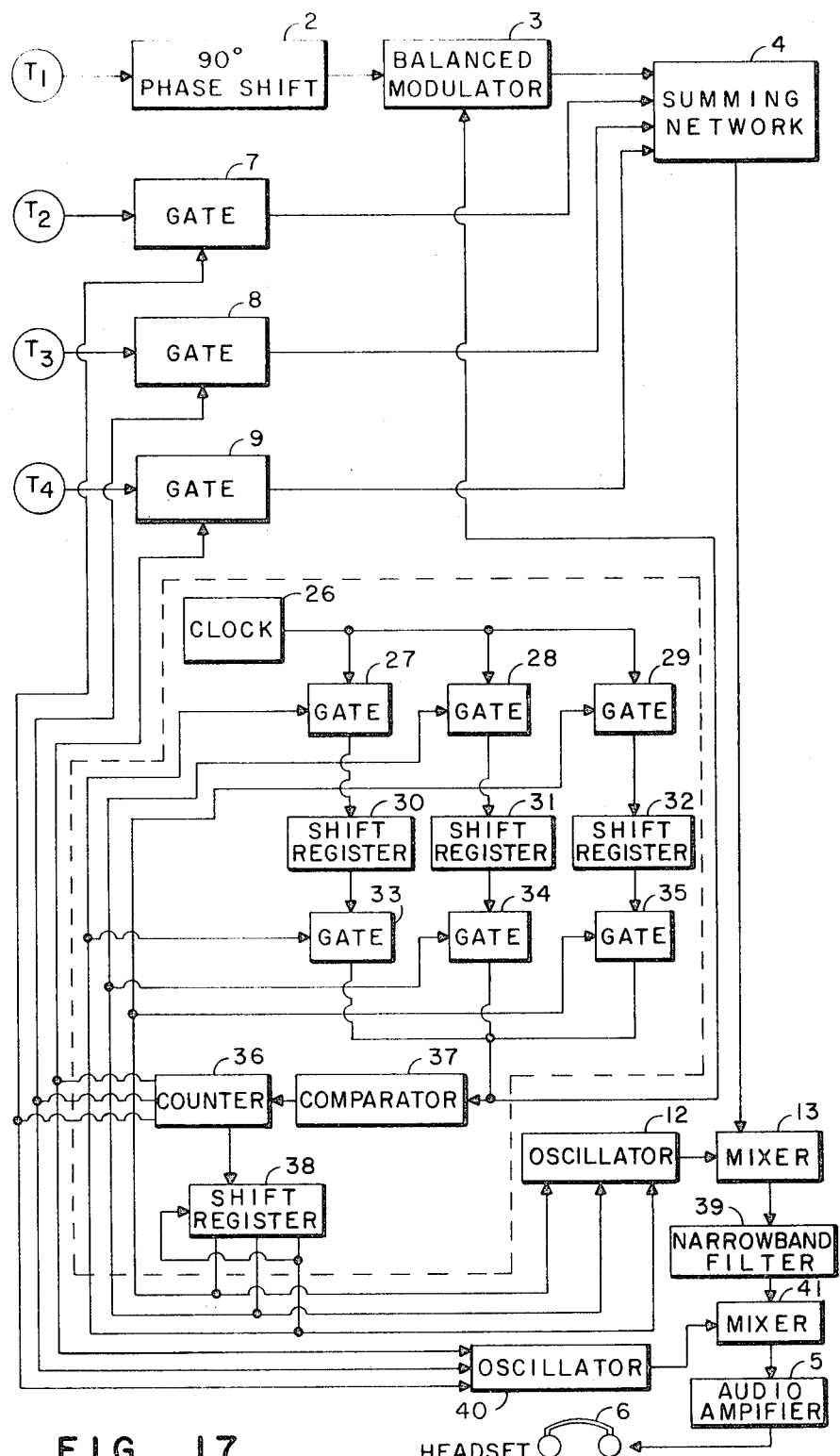
FIG. 17 is a functional diagram of a system in accordance with the present invention employing pulse coding for beacon identification and frequency coding for directional plane identification.

As a further example of the many possible options that may be chosen for this type of system, the timing network may be used to change the frequency of oscillator 12 to sequentially listen to different beacons and to control the keying-signal generator to provide a different code for each beacon. Although this approach is more complex than some of the others discussed earlier, it will demonstrate many of the basic principles and multiple beacon as well as multiple plane operation. FIG. 17 is a block diagram of such a system. The blocks in this system perform essentially the same functions that have been described for them in previous diagrams. All of the blocks outside the dashed lines perform the same function in FIG. 17 that they performed in FIG. 16. The timing network 22 and keying-signal generator 21 of FIG. 16 have been replaced by the blocks shown inside the dashed lines in FIG. 17. In this system the keying-signal to balanced modulator 3 is one of the codes stored in shift registers 30, 31, and 32. The gates 27, 28, 29, 33, 34, and 35 are controlled to provide the correct code depending upon the state of shift register 38 which also controls the frequency of oscillator 12 to select a particular beacon frequency for listening. This applies a code such as one of the three codes of FIG. 8 to each of the three beacon signals which are sequentially selected. The operation of this portion of the system is similar to that discussed relative to FIG. 14 but applies the code to a particular beacon rather than a particular directional plane. The choice of three beacons was exemplary only and any number could have been chosen. Output signals from counter 36 sequentially select directional planes by controlling gates 7, 8, and 9. These same signals control the frequency of oscillator 40 so that a different audio output frequency will be provided for each directional plane for identification purposes. The same code is repeated for all three planes.

Thus the system of FIG. 17 sequentially selects each of the three planes for a particular beacon. The planes are identified by their corresponding audio frequencies. After all three planes have been covered, it selects the next beacon which is identified by a different code. (The code is added in the receiver. The beacon itself is a sine wave transmitter with no modulation and is distinguished from the other beacons only by its frequency.) Thus the full sequence of events includes selection of each of the three planes for a particular beacon and sequencing these events for the different beacons.

Although not shown in FIG. 17, a signal from counter 36 may be used to gate off audio amplifier 5 to identify a transition from one beacon to another and, therefore, the beginning of a particular code or alternatively to gate a distinctive tone burst into the audio amplifier for the same purpose.

The system as shown in FIG. 17 automatically selects all three planes for all three beacons. Although not shown on the diagram, it is a simple matter to add a switch for manual operation. For manual selection of the beacon a switch is substituted for the outputs of shift register 38 and used to control gates 27, 28, 29, 33, 34, and 35 as well as the frequency of oscillator 12. Similarly a switch may be substituted for the outputs to the left of counter 36 for manual selection of the three planes. Thus by adding two four-position switches, the operator may select either automatic sequencing of the three planes or manual selection of any one plane and he may select either automatic sequencing of the beacons or manual selection of a particular beacon.

Throughout all embodiments described herein, the output from transducer $T_1$ is applied through a 90° phase shifting device prior to application to the balanced modulator or alternatively may be phase shifted by 90° somewhere in this line. In the embodiment of FIG. 17 an operation is depicted utilizing multiple beacons of different frequencies. It may be shown that operation with fixed baseline separations of the transducer configuration worn on the aquanaut's headpiece and with a given implementation of the 90° phase shifting means is only negligibly affected when employing multiple beacons of different frequencies. For example, it may be shown that even a simple phase shifting network may serve to introduce the desired 90° phase shift for multiple tones as might be employed in a particular embodiment with negligible departure from the desired 90° shift. Alternatively, the embodiment of FIG. 17 might include means for adjusting the phase shifting means in time synchronism with the system to provide exacting 90° phase shift for the particular beacon frequency for which output information is being registered. A further exacting expedient might be the incorporation of a plurality of phase shifters each designed to introduce 90° shift for a particular beacon frequency with means for sequentially gating the output from transducer $T_1$ through sequential ones of these phase shifters.

Further, the mathematical development leading to equation (8), above, implying a fixed relationship between the transducer baseline $d$, velocity of propagation $V$ and tone $\omega$ under consideration, further introduces no serious problem. By judicious choice of baseline length $d$ such that the term $\omega d/V$ never exceeds 90° for any $\omega$ used, the problem of double nulls that could occur may be avoided, and only a reduction in the depth of the null might be experienced which is not serious. Reference is made to expression (12) above which, if the term $\omega d/V$ had been carried along, would become:

$$S_5 = A \sqrt{1 + K^2 + 2K \sin\left(\frac{\omega d}{V} \cos\theta\right)} \cos\left[\omega t + \tan^{-1} \frac{K + \sin\left(\frac{\omega d}{V} \cos\theta\right)}{\cos\left(\frac{\omega d}{V} \cos\theta\right)}\right] \quad (13)$$

Reference to expression (13), considering that we are not particularly interested in the phase angle of the tone but rather the amplitude factor, indicates that the sine will be taken of an angle that varies between zero and something different that 90°, resulting only in a reduction of modulation sensitivity. A sharp and distinct null would still exist.

A number of systems have been described for providing an aquanaut with aural orientation and position information. Circuits for producing the timing and modulation signals have also been described. Other circuits are believed to be well enough known that further individual detailed description is not required. Other combinations of the various basic systems described will also be evident to the reader without further description here.

The systems are relatively small, lightweight, and simple and may be mounted directly upon the aquanaut's headpiece. The aural indication requires no visibility and no active participation by the aquanaut. A short training period should permit the aquanaut to make effective use of the system. He will then be released from present restrictions on his freedom of activity resulting from the possibility of becoming disoriented and lost.

Although this invention has been described with respect to particular embodiments thereof, it is not to be so limited, as changes might be made therein which fall within the scope of the invention as defined in the appended claims.

I claim:

1. An aural orientation receiving system comprising a pair of first and second signal receiving transducers space separated by a predetermined baseline the perpendicular bisector of which lies in and establishes a reference plane, a beacon signal transmitting source including a predetermined tonal frequency component, each of said transducers receiving said beacon signal, signal processing means receiving the outputs from each of said transducers and developing an aural output signal comprised of a continuous tone of fixed amplitude corresponding to said tonal frequency component when said beacon source lies on said reference plane, and respective repetitive complementary impulse sequences of said tonal frequency when said beacon source lies on respective sides of said reference plane, the modulation index of said impulse sequences being proportional to the angular discrepancy between said beacon source and said reference plane.

2. A system as defined in claim 1 further comprising third and fourth transducers, said first and third transducers comprising a second transducer pair, said first and fourth transducers comprising a third transducer pair, said transducer pairs defining baselines therebetween which respectively lie in and establish first, second and third reference planes the respective intersections of which define orthogonal axes, said signal processing means comprising means for sequential processing the signals received from said first, second and third transducer pairs to develop sequential aural output signals each of which comprises a continuous tone when the beacon source lies on the associated reference plane, said aural output signals comprising sequential first, second and third respectively aurally distinguishable complementary tone impulse sequences when said beacon source lies on respective sides of the associated ones of said reference planes.

3. A system as defined in claim 1 wherein said signal processing means comprising phase shifting means receiving the output from said first transducer and shifting the phase thereof by 90°, means for reversing the phase of the output of said phase shifter at a repeated sequence of time intervals wherein the phase reversed and non-phase reversed intervals of each of said repeated sequences are complementary, summing means receiving the output of said phase reversing means and that of the other transducer of said pair, and the output of said summing means comprising said aural output signal.

4. A system as defined in claim 2 wherein said signal processing means comprises phase shifting means receiving the output from said first transducer and shifts the phase thereof by 90°, means for periodically reversing the phase of the output of said phase shifting means at a repeated sequence of time intervals wherein the phase reversed and non-phase reversed intervals of each said repeated sequences are complementary, signal summing means receiving the output of said phase reversing means as a first input thereto, means for sequentially gating the outputs of said second, third and fourth transducers as respective second inputs to said summing means during successive time periods equal that of said repeated sequence of time intervals, and the output of said summing means sequentially comprising aural outputs definitive of the angular orientation of said beacon with sequential ones of said first, second and third reference planes.

5. A system as defined in claim 4 further comprising means for heterodyning the output of said signal summing means to a selected different frequency, the output of said heterodyning means comprising said aural output signal.

6. An aural orientation receiving system comprising first, second, third, and fourth receiving transducers, said first and second transducers comprising a first transducer pair, said first and third transducers comprising a second transducer pair, said first and fourth transducers comprising a third transducer pair, the transducers in each of said pairs defining an associated baseline the perpendicular bisector of which lies in and defines an associated one of three mutually orthogonal reference planes, a beacon signal transmitting source including a predetermined tonal frequency component, each of said transducers receiving said beacon signal, signal processing means receiving the outputs of each of said transducers, said processing means comprising means for processing the signals received from said first, second, and third transducer pairs to develop aural outputs at respective first, second, and third tonal frequencies, each of said aural outputs comprising a constant amplitude tone when the beacon source lies on the associated one of said reference planes and first and second aurally distinguishable complementary tone impulse sequences when said beacon lies on respective sides of the associated one of said transducer pair defined reference plane, the modulation index of said tonal sequences being proportional to the angular discrepancy between said beacon source and the associated one of said reference planes.

7. A system as defined in claim 6 wherein said signal processing means comprises means for sequentially processing the signals from said first, second, and third transducer pairs to develop said aural outputs in repetitive time sequence.

8. A system as defined in claim 6 wherein said signal processing means comprising means for simultaneously processing the signals from said first, second, and third transducer pairs to develop said aural outputs simultaneously.

9. A system as defined in claim 7 wherein said signal processing means comprises phase shifting means receiving the output from said first transducer and shifting the phase thereof by 90°, means for reversing the phase of the output of said phase shifting means at a repeated sequence of time intervals wherein the phase reverse and non-phase reverse intervals of each said repeated sequence are complementary, means for sequentially converting the signals from each of said second, third and fourth transducers to respective first, second and third different tonal frequencies for successive time periods corresponding to the duration of successive ones of said repeated sequences, signal summing means receiving the output of said phase reversing means as a first input thereto, means for successively applying said first, second and third tonal frequencies as second inputs to said signal summing means, and the output of said summing means comprising said aural output signal.

10. A system as defined in claim 7 wherein said signal processing means comprises phase shifting means receiving the output from said first transducer and shifting the phase thereof by 90°, means for reversing the phase of the output of said phase shifting means at a repeated sequence of time intervals wherein the phase reversed and non-phase reversed intervals of each said repeated sequence are complementary, signal summing means receiving the output of said phase reversing means as a first input thereto, means for sequentially applying the outputs from said second, third and fourth transducers as successive second input signals to said signal summing means, signal mixing means receiving the output of said summing means as a first input thereto, means synchronous with said gating means for successively applying first, second and third respectively different injection frequency signals as successive second inputs to said signal mixing means, and the output from said mixing means comprising said aural output signal.

11. A system as defined in claim 10 comprising frequency heterodyne means receiving the output from said signal summing means, narrowband filter means receiving the output from said heterodyne means, and the output of said heterodyning means comprising said first input to said signal mixing means.

12. A system as defined in claim 8 wherein said signal processing means comprises phase shifting means receiving the output from said first transducer and shifting the phase thereof by 90°, means for reversing the phase of the output of said phase shifting means at a repeated sequence of time intervals wherein the phase reversed and non-phase reversed intervals of each said repeated sequence are complementary; means including first, second, and third injection oscillator frequency sources for respectively and simultaneously converting the outputs from said first, second, and third transducers to first, second, and third heterodyne frequencies, signal summing means receiving said first, second, and third heterodyne frequencies as inputs thereto, signal mixing means for individually and simultaneously mixing the output from said first transducer with respective ones of said first, second, and third injection oscillator frequencies, the outputs of said signal mixing means being applied as further inputs to said signal summing means, and the output from said signal summing means comprising said aural output signal.

13. An aural orientation receiving system comprising first, second, third, and fourth signal receiving transducers, said first and second transducers comprising a first transducer pair, said first and third transducers comprising a second transducer pair, said first and fourth transducers comprising a third transducer pair, said transducer pairs defining respective baselines therebetween the perpendicular bisectors of which lie in and establish respective first, second, and third reference planes the intersections of which define orthogonal axes, a plurality of N beacon signal transmitting sources each of a different frequency, each of said transducers receiving each of said different transmitted frequencies, signal processing means for sequentially developing a first and sequential aural sequences including an Nth aural sequence; said first aural sequence comprising a constant amplitude tone at a first audio frequency when said first beacon source lies on said first reference plane and respective complementary impulses of a first sequence at said first audio frequency when said first beacon source lies on respective sides of said first reference plane followed by an aural output signal comprised of a constant amplitude tone at a second audio frequency when said first beacon source lies on said second reference planes and respective complementary impulses of said first sequence at said second audio frequency when said first beacon source lies on respective sides of said second reference plane, and terminated by an aural output signal comprised of a constant amplitude tone at a third audio frequency when said first beacon source lies on said third reference plane and respective complementary impulses of said first sequence at said third audio frequency when said first beacon source lies on respective sides of said third reference plane; further ones of said aural sequences being like that of said first aural sequence with said impulses therein being of successive complementary sequences including an Nth complementary sequence, said first and successive ones of said complementary sequences being aurally distinguishable.

14. A system as defined in claim 13 wherein said signal processing means comprises, phase shifting means receiving the output of said first transducer and shifting the phase thereof by substantially 90°, means for periodically reversing the phase of the output of said phase shifting means during each of a plurality of N successive time intervals the sum of which corresponds to one of said aural sequences, the phase reversed and non-phase reversed periods during each of said intervals being complementary and mutually asynchronous, signal summing means receiving the output of said phase reversing means as a first input thereto, means for sequentially gating such second, third, and fourth transducer outputs as respective second inputs to said signal summing means, first signal mixing means receiving the output of said summing means as a first input thereto, injection oscillator means for sequentially providing a plurality of N injection frequencies including a first and an Nth injection frequency as second inputs to said first mixing means in time synchronism with the time periods defined by respective ones of said plurality of aural sequences, narrow band filtering means receiving the output from said first signal mixing means, second signal mixing means, further injection oscillator means sequentially providing respective first, second, and third injection frequencies as second inputs to said second mixing means in time synchronism with the time intervals defining each respective first, second, and third phase-reversal sequence in each of said plurality of aural sequences, and the output of said second mixing means comprising said aural output signal.

15. An aural orientation receiving system comprising a plurality of receiving transducers pairs of which are space separated by predetermined baselines the perpendicular bisectors of which lie in and establish respective reference planes, a beacon signal transmitting source including a predetermined tonal frequency component, each of said transducers receiving said beacon signal, signal processing means receiving the outputs from each of said transducers, said signal processing means comprising means for sequential processing the signals received from each pair of said plurality of transducer pairs to develop sequential aural output signals each of which comprises a continuous tone when the beacon source lies on the associated reference plane, said aural output signals comprising sequential respectively aurally distinguishable complementary tone impulse sequences when said beacon source lies on respective sides of the associated one of said reference planes, the modulation index of said impulse sequences being proportional to the angular discrepancy between said beacon source and said reference plane.

16. An aural orientation receiving system comprising a plurality of receiving transducers predetermined pairs of said transducers defining an associated baseline the perpendicular bisector of which lies in and defines an associated one of a plurality of reference planes, a beacon signal transmitting source including a predetermined tonal frequency component, each of said transducers receiving said beacon signal, signal processing means receiving the outputs of each of said transducers, said processing means comprising means for processing the signals received from each of said predetermined transducer pairs to develop aural outputs at respectively different tonal frequencies, each of said aural outputs comprising a constant amplitude tone when the beacon source lies on the associated one of said reference planes and first and second aurally distinguishable complementary tone impulse sequences when said beacon lies on respective sides of the associated one of said transducer pair defined reference plane, the modulation index of said tonal sequences being proportional to the angular discrepancy between said beacon source and the associated one of said reference planes.

17. A system as defined in claim 16 wherein said signal processing means comprises means for sequentially processing the signals from each of said plurality of transducer pairs to develop said aural outputs in repetitive time sequence.

18. A system as defined in claim 16 wherein said signal processing means comprising means for simultaneously processing the signals from each of said plurality of transducer pairs to develop said aural outputs simultaneously.

19. An aural orientation receiving system comprising a plurality of receiving transducers, predetermined pairs of said transducers defining respective baselines therebetween the perpendicular bisectors of which lie in and establish a plurality of M respective reference planes, a plurality of N beacon signal transmitting sources each of a different frequency, each of said transducers receiving each of said different transmitted frequencies, signal processing means for sequentially developing a first and sequential aural sequences including an Nth aural sequence; said first aural sequence comprising a constant amplitude tone at a first audio frequency when said first beacon source lies on a first one of said plurality of reference planes and respective complementary impulses of a first sequence at said first audio frequency when said first beacon source lies on respective sides of said first reference plane followed by an aural output signal comprised of a constant amplitude tone at a second audio frequency when said first beacon source lies on a second one of said reference planes and respective complementary impulses of said first sequence at said second audio frequency when said first beacon source lies on respective sides of said second reference plane, and terminated by an aural output signal comprised on a constant amplitude tone at an Mth audio frequency when said first beacon source lies on said Mth reference plane and respective complementary impulses of said first sequence at said Mth audio frequency when said first beacon source lies on respective sides of said Mth reference plane; the sequential ones of said aural sequences being like that of said first aural sequence with said impulses therein being of successive different complementary sequences including an Nth complementary sequence, each of said sequential ones of said aural sequences providing source location indication for respective successive ones of said N beacon sources, said first and successive ones of said complementary sequences being aurally distinguishable.

20. An aural orientation receiving system comprising a plurality of receiving transducers, predetermined pairs of said transducers defining respective baselines therebetween the perpendicular bisectors of which lie in and establish a plurality of M respective reference planes, a plurality of N beacon signal transmitting sources each of a different frequency, each of said transducers receiving each of said different transmitted frequencies, signal processing means for sequentially developing a first and sequential aural sequences including an Nth aural sequence; said first aural sequence comprising a constant amplitude tone at a first audio frequency when said first beacon source lies on a first one of said plurality of reference planes and respective complementary impulses of a first sequence at said first audio frequency when said first beacon source lies on respective sides of said first reference plane followed by an aural output signal comprised of a constant amplitude tone said first audio frequency when said first beacon source lies on a second one of said reference planes and respective complementary impulses of a second sequence at said first audio frequency when said first beacon source lies on respective sides of said second reference plane, and terminated by an aural output signal comprised of a constant amplitude tone at said first frequency when said first beacon source lies on said Mth reference plane and respective complementary impulses at said first audio frequency of said Mth sequence when said first beacon source lies on respective sides of said Mth reference plane; the sequential ones of said aural sequences being like that of said first aural sequence with said impulses therein being of successive different audio frequencies including an Nth audio frequency, each of said further ones of said aural sequences providing source location indication for respective successive ones of said N beacon sources, said first and successive ones of said complementary sequences being aurally distinguishable.

* * * * *